Oct. 18, 1938.  A. W. CARPENTER  2,133,537
OPTICAL REDUCTION PRINTER
Filed July 18, 1935    4 Sheets-Sheet 1

INVENTOR.
A.W. CARPENTER
BY
ATTORNEY

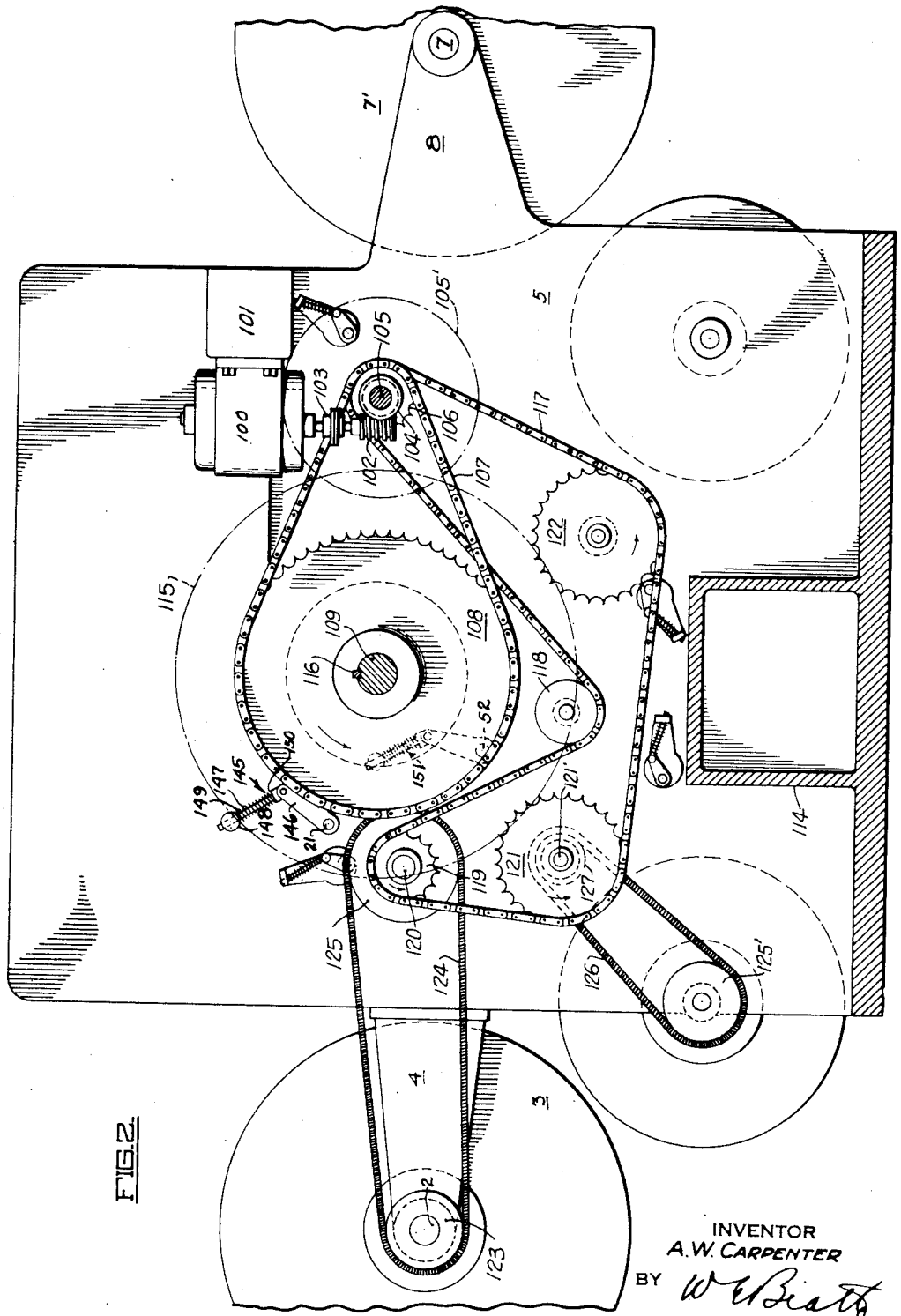

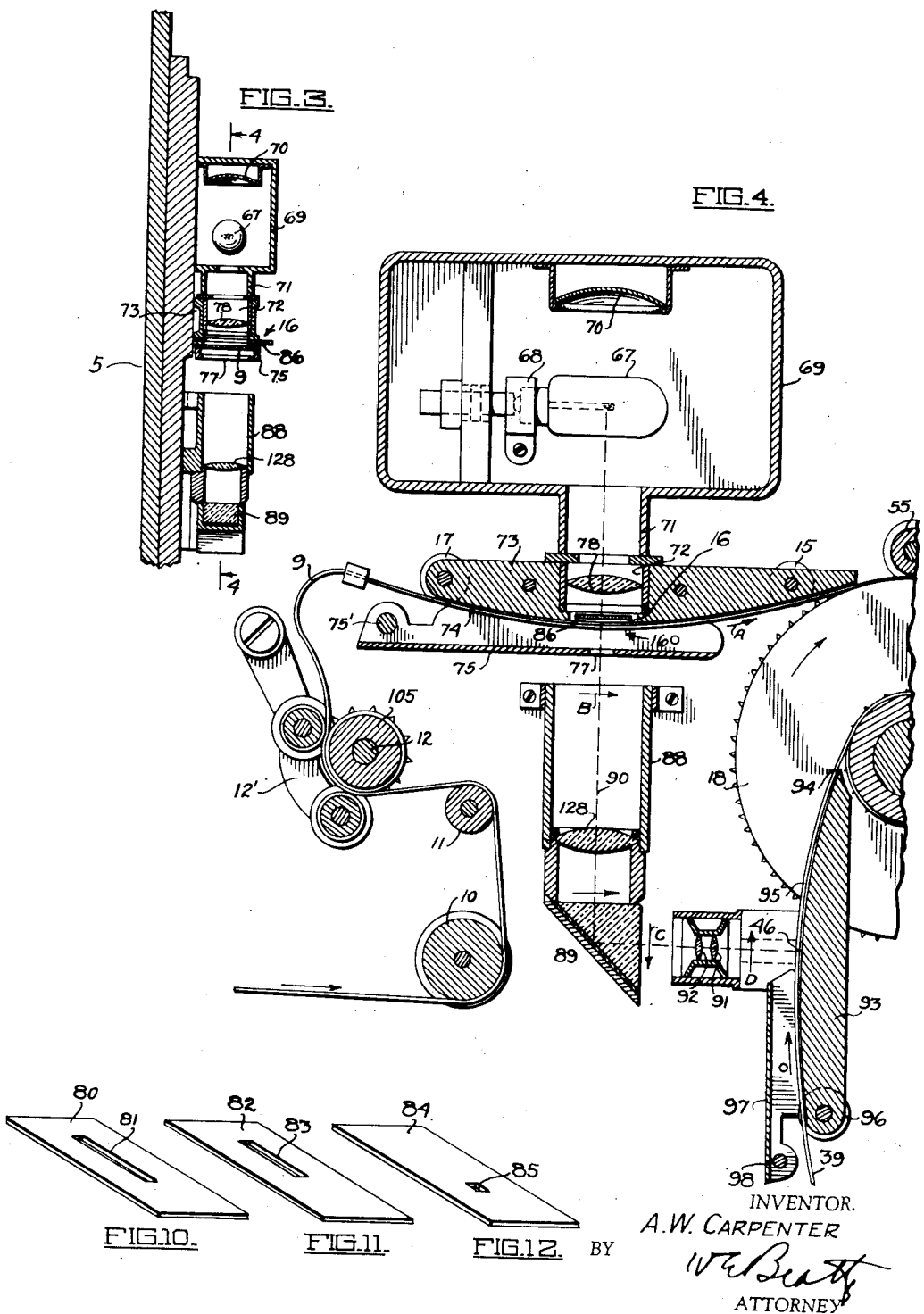

Oct. 18, 1938.  A. W. CARPENTER  2,133,537
OPTICAL REDUCTION PRINTER
Filed July 18, 1935  4 Sheets-Sheet 4

INVENTOR
A. W. CARPENTER
BY W. E. Beatty
ATTORNEY

Patented Oct. 18, 1938

2,133,537

UNITED STATES PATENT OFFICE 2,133,537

OPTICAL REDUCTION PRINTER

Arthur W. Carpenter, New York, N. Y., assignor to United Research Corporation, Long Island City, N. Y., a corporation of Delaware Application July 18, 1935, Serial No. 31,968

7 Claims. (Cl. 88—24)

This invention relates to optical printing of motion picture film and particularly to continuous optical printing wherein a reduction in size is made between the negative film and the final positive print.

In the art of printing motion picture films, and particularly talking or sound films bearing both images of pictures and sound, common driving means have been employed for maintaining the proper relationship between the films and the proper displacement between the picture and sound images. A printer of this general type is disclosed and claimed in my joint patent with Maurice G. Ricker, No. 1,993,085 of March 5, 1935.

The present invention has several of the broad features of the patent such as a common sprocket and an optical path between the positive and negative, the direction of the film being such that the projected image travels in a direction to provide a correct print. The present invention is directed to an optical printer in which the negative images, picture and sound, are efficiently printed on a smaller sized film than that of the negative. This involves the necessity of obtaining proper synchronism between, for instance, a 35 mm. negative and a 16 mm. positive, and making proper optical transpositions for obtaining the proper proportions of the smaller images. This is accomplished by a novel combination drive sprocket stabilized by an integrally mounted flywheel. Specially constructed pad rollers under control of tensioning and dampening means aid in providing uniform advancement past the printing apertures. The aperture gates have film supporting or stiffening shoes which longitudinally curve the film between the apertures and sprocket to prevent sprocket teeth fluctuations from affecting the movement of the film at the apertures.

An object of the invention, therefore, is to accurately drive and correlate a large negative film to a smaller positive film during the continuous printing thereof.

A further object is to facilitate the driving or advancing of different sized films at separated points while maintaining a uniform and stable advancement at these points.

The various features of the invention and the details thereof will be more fully understood by reference to the following description read in conjunction with the accompanying drawings, in which Fig. 1 is a front elevational view of a motion picture film printer embodying my invention.

Fig. 2 is a rear elevational view of my invention taken along line 2—2 of Fig. 5.

Fig. 3 is a sectional elevational view taken on line 3—3 of Fig. 1.

Fig. 4 is a sectional elevational view taken on line 4—4 of Fig. 3.

Fig. 10 is a perspective view of a mask which permits both sound and picture to be printed upon the positive film.

Fig. 11 is a perspective view of the mask which is employed to print only the picture part upon the positive film.

Fig. 12 is a perspective view of the mask which is employed to print only the sound track upon the positive film.

Figure 1:
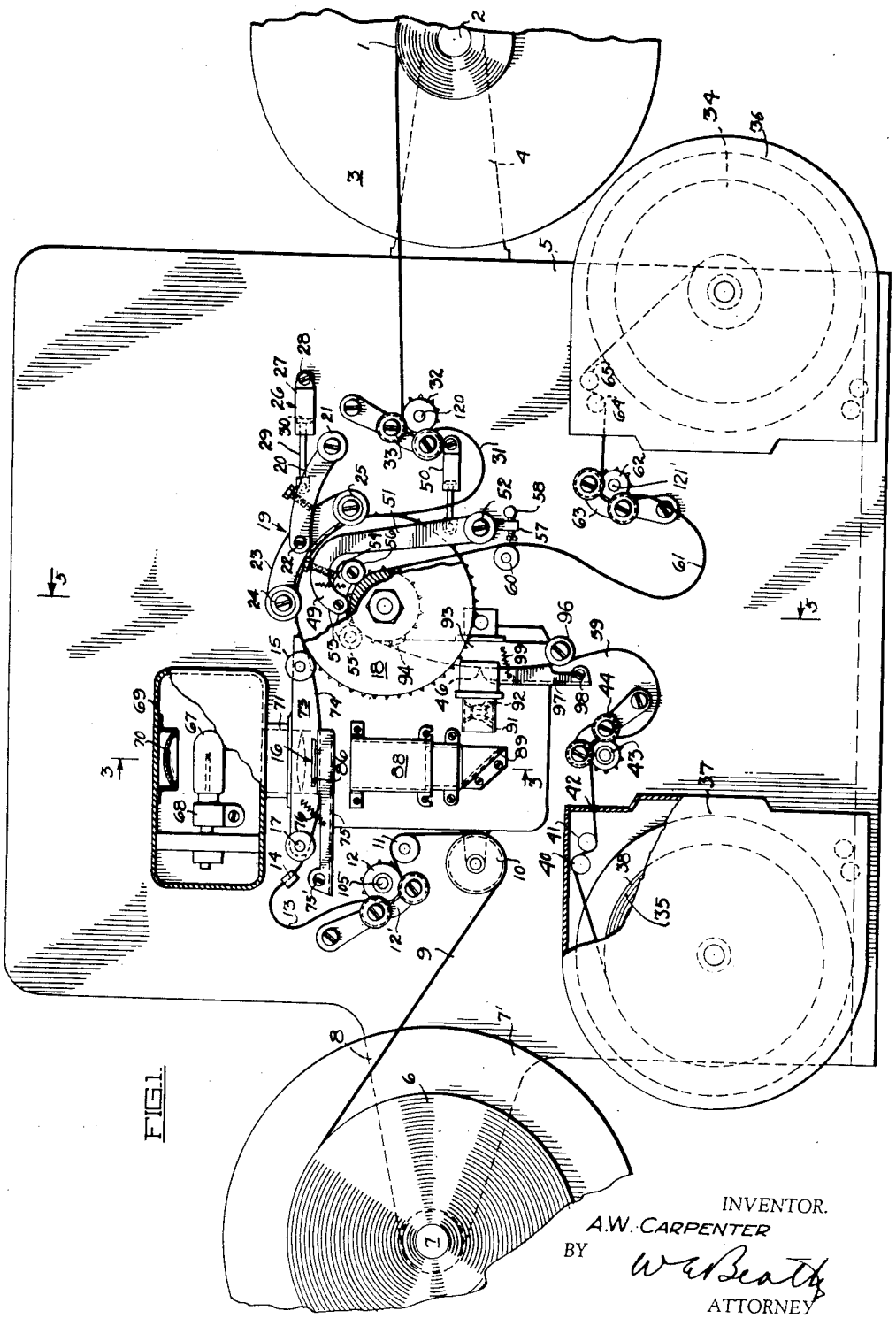
Figure 6:
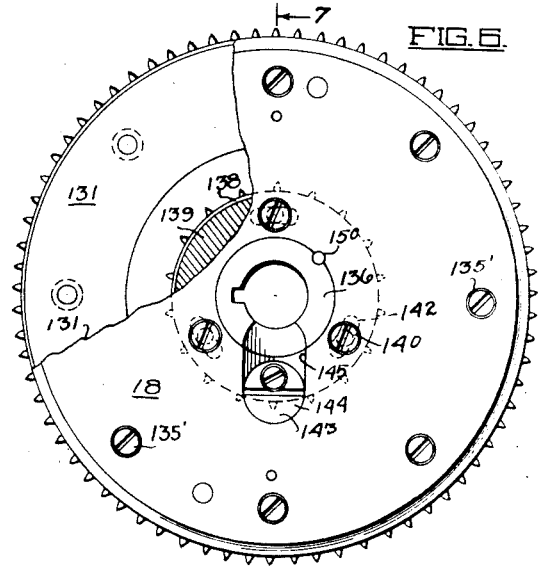
Fig. 6 is a front view of a common lead sprocket partly broken away.

Referring now to Fig. 1, it will be noted that the negative take-up roll 1 is driven by a take-up spindle 2 having a flange 3 at the rear thereof. The spindle 2 is journalled in a bearing formed on an arm 4 projecting from the main wall section 5. The negative supply roll 6 is carried on a free spindle 7 which has a rear flange 7' thereon. The spindle 7 is journalled in the end of an arm 8 provided on the opposite side of the wall 5.

From the supply roll 6 the film 9 is led under a snubbing roller 10, over a guide roller 11, and then around a drive sprocket 12. A pad roller 12' of the type described and claimed in the copending application of Ernest Ross and Axel S. Eliason, Serial No. 27,157 filed June 18, 1935, is provided to hold the film in engagement with the sprocket 12. From the sprocket 12 the negative forms a free loop 13.

As is well known to those familiar with the art, the negative may have certain parts which have considerably more density than others, that is, when photographing, the light conditions for one scene may have been much better than for another. Therefore, one scene will show up lighter than another. This varying density of the negative is usually compensated for by either varying the printing light aperture or by varying the intensity of the printing light. One of the many methods of automatically varying the intensity of the printing light employs a contactor switch 14 which operates a suitable variable resistance within the lamp circuit and which, in turn, is operated by notches or grooves placed at intervals along one side of the negative. As this method of varying the intensity of the printer light forms no part of my present invention I will not describe it in further detail.

The negative, after forming the free loop 13, passes through the switch 14 and thence between a pair of edge guiding rollers 17 and through a projection gate generally indicated at 16 where the image of the negative is projected downwardly onto the raw positive film. From the projection gate 16 the film is led between a pair of edge guiding rollers 15 and thence onto a portion of the outer toothed surfaces of a common double lead sprocket 18, the details of construction of which are described and claimed in the co-pending application of Ernest Ross, Serial No. 15,771, filed April 11, 1935.

As shown in Figs. 6 to 9 the sprocket 18 comprises a pair of flanges 130 and 131 having toothed sprocket discs 132 and 133 attached thereby by clamping discs 134 and 135 which are secured by screws 135'. The flange 131 has a hub portion 136 formed thereon on which the flange 130 is mounted. A pin 150 (Fig. 6) prevents relative angular movement of the two flanges 130 and 131. On the inner side of the flanges 130 and 131 is mounted a pair of smaller toothed discs 137 and 138 being spaced apart by a spacer ring 139. A plurality of clamping bolts 140 are mounted through apertures 141 in the flange 130, through elongated slots 142 (Fig. 6) and are threadably secured within the flange 131. In order to angularly adjust one pair of toothed sprocket discs in relation to the other, an eccentric 143 is provided. The head 144 of the eccentric 143 engages an elongated groove 145 provided in flange 130. A projection 146 on the rear end of the eccentric 143 is rotatably mounted within an aperture 147 extending through the disc 137 and partially through the spacer ring 139. A screw 148 holds the eccentric 143 in place. Thus it may be seen that by loosening the clamping bolts 140 and 148 the eccentric 143 may be rotated to effect angular displacement of one of the pairs of sprocket teeth in respect to the other for the purpose of aligning the films in their proper relative positions.

A self equalizing pad roller generally indicated at 19 is provided to maintain the negative film 9 in engagement with the sprocket 18 and comprises an arm 20, mounted upon a rotatable shaft 21 projecting through the wall 5. The other end 22 of the arm 19 is pivoted to the central portion of a curved lever 23 carrying pad rollers 24 and 25 at its outer ends. The pad roller 19 is spring pressed into engagement with the film by a snap-over spring arrangement generally indicated at 145 (Fig. 2). The snap-over arrangement 145 is used on all the pad rollers shown in the drawings and is described and claimed in co-pending application Serial No. 27,157 filed June 18, 1935, mentioned above.

An arm 146 is secured to the shaft 21 and is pivotally attached at its free end to a second arm 147. The arm 147 is slidably mounted in a bearing 148 rotatably mounted in the wall 5. A spring 149 is placed over the arm 147 and engages the bearing 148 at one end and a shoulder 150, provided on the lower portion of the arm 147, at its other end. The pad roller 19 may thus be held in closed position by the spring 149 or it may be swung upward by hand until the arms 146 and 147 pass their dead center position, at which time the spring will act to hold it in an open position. In order to prevent the pad roller 19 from bouncing over splices made on the film, or from dropping in a sharp impact against the sprocket, if released when in a retracted position, I provide a pneumatic dash pot 26 comprising an enclosed cylinder 27 pivoted to the wall 5 at 28. A rod 29 is pivotally attached to the arm 20 of the pad roller 19 at one end and operates a plunger 30 within the cylinder 27.

From the lead sprocket 18 the negative film forms a free loop 31 and is then engaged by a driving sprocket 32 provided with a pad roller 33. The film is then reeled onto the take-up roll 1.

Referring now to the positive film, it will be noted that both the take-up reel 34 and the supply reel 35 are mounted within lightproof casings 36 and 37 to prevent exposure of the entire raw positive film, should the printer be accidentally exposed to light. From the positive film supply roll 38 the positive film 39 passes around a pair of snubbing rollers 40 and 41 and thence out of the lightproof casing 37 through a lightproof aperture 42. From the aperture 42 the film 39 is drawn into engagement with a driving sprocket 43 having a pad roller 44 associated therewith. The film 39 then passes into the film printing gate generally referred to at 46 where the image from the negative film 9 is printed thereon. On leaving the film printing gate 46 the film is led onto the smaller toothed surfaces 137 and 138 of the common double sprocket 18. The surfaces 137 and 138 are provided with a pad roller 49 similar in principle to pad roller 19 and which also has a pneumatic dash pot 50 associated therewith. The pad roller 49 comprises an arm 51 mounted on a shaft 52 which is rotatably mounted in the wall 5; the other end 53 of the arm 51 is pivotally attached to a curved arm 54 which carries rollers 55 and 56. The pad roller 49 is pressed into engagement with film 39 by a spring arrangement 151 (Fig. 2). An adjustable stop 57 provided on the bottom portion of the arm 51 is adapted to strike against a stop 58 provided on the wall 5 to limit the pressure of the rollers 55 and 56 upon the positive film 39.

From the common lead sprocket 18 the film 39 is guided over a free guide roller 60; thence into a free loop 61, and finally into engagement with a drive sprocket 62 against which it is held by a pad roller 63. From the sprocket 62 the film enters an aperture in the lightproof casing 36 similar to the aperture 42 and thence it passes around snubbing rollers 64 and 65 onto the take-up reel 34.

I will now describe the optical system in detail. Referring to Figs. 3 and 4, it will be noted that the printing lamp 67 is mounted in a bracket 68 within a light-proof housing 69 which is secured in any suitable way to the wall 5. A reflector 70 assists in directing the light rays from lamp 67 downwardly through a tube 71 situated below the lamp housing 69 and opening thereinto. The tube 71 communicates with a passage 72 within a film guide 73 forming part of the film projecting gate 16. The negative film 9 is guided under the curved edge 74 of the film guide or support 73 and is held into engagement therewith by a pressure pad 75 which is pivoted to the wall 5 at 75' and is pressed into engagement with the film 9 by means of a spring 76 (see Fig. 1). The bottom of the pressure pad 74 is provided with an aperture 77 through which the light is allowed to pass. A condenser lens 78 is provided within the passage 72 of the film guide 73.

As was stated before, masks having slits or apertures of various lengths may be interposed in the path of the printer light rays so as to print only desired portions of the film. Such masks are shown in Figs. 10, 11 and 12 wherein the mask 80 is provided with a slit 81 which is of a length equal to that of the combined picture and sound track. Therefore the mask 80 will print both the picture and sound track upon the positive film. The mask 82 is provided with an aperture 83 of the same length as the picture part of the film while the mask 84 is provided with an aperture 85 commensurate with the width of the sound track. Any one of the masks 80, 82 or 84 may be placed within an aperture 86 provided in the lower part of the film guide 73 as will be seen in Figs. 3 and 4. Below the film projection gate 16 is mounted a tube 88 the lower end of which communicates with a prismatic reflector 89 which reflects the light rays 90 at right angles to their original path. Above the prism 89 is a compensating element 128. This compensating element 128 is here shown as a bi-convex spherical element, but it may equally well be a plain parallel element or a cylindrical element according as one may wish to print one or another standard type of sound track.

Adjacent to the reflector 89 is a pair of objective lenses 91 and 92 through which the reflected light rays pass before reaching the film printing gate 46. The film gate 46 comprises a film guide or support 93 placed in a vertical position with one end 94 thereof adjacent the smaller toothed surfaces 137 and 138 of the lead sprocket 18. The positive film 39 is led over the curved face 95 of the guide 93 and thence tangentially onto a portion of the periphery of the toothed surfaces 137 and 138. Edge guiding rollers 96 keep the positive film 39 in edgewise alignment while traveling through the film gate 46. A pressure pad 97 which is pivoted at 98 is spring pressed against the film 39 as by springs 99 (see Fig. 1).

Referring again to Fig. 4, it will be noted that as the negative film 9 passes in the direction of the arrow A through the printing gate 16, there will be a scanning action of the image of the negative due to the film moving across the illuminated area. This scanning action or movement of the image will be in the direction of the arrow B. When reflected by the prism 89 the sweep of the image will be changed into downward direction as shown by the arrow C. This downward motion of the image is inverted by the objective lens 91 and 92 into an upward motion in the direction of the arrow D which will be in the same direction and at the same speed as that of the positive film 39. It is to be noted that the size and speed of the image produced upon the positive film 39 bears the same relation to the size and speed of the image produced by the negative film 9 at the film gate 16 as the speed of the positive film 39 does to the speed of the negative film 9. Therefore the image will be stationary relative to the moving positive film 39.

I will now describe the driving mechanism for the various drive sprockets and reels. Referring to Fig. 2, it will be noted that a single motor 100 drives the entire mechanism. The motor 100 is mounted on a bracket 101, provided on the rear of the wall 5 and drives a worm 102 through a coupling 103. The worm 102 drives a worm gear 104 rigidly secured to a shaft 105 which is journaled within a bearing formed in the wall 5 and carries at its other end the film driving sprocket 12. Securely mounted on the shaft 105 directly in back of the worm gear 104 is a chain sprocket 106 adapted to drive a chain 107 which in turn drives a large sprocket 108, mounted upon a shaft 109. Also mounted upon the shaft 105 is a flywheel 105' shown by the dotted lines in Fig. 2.

Figure 5:
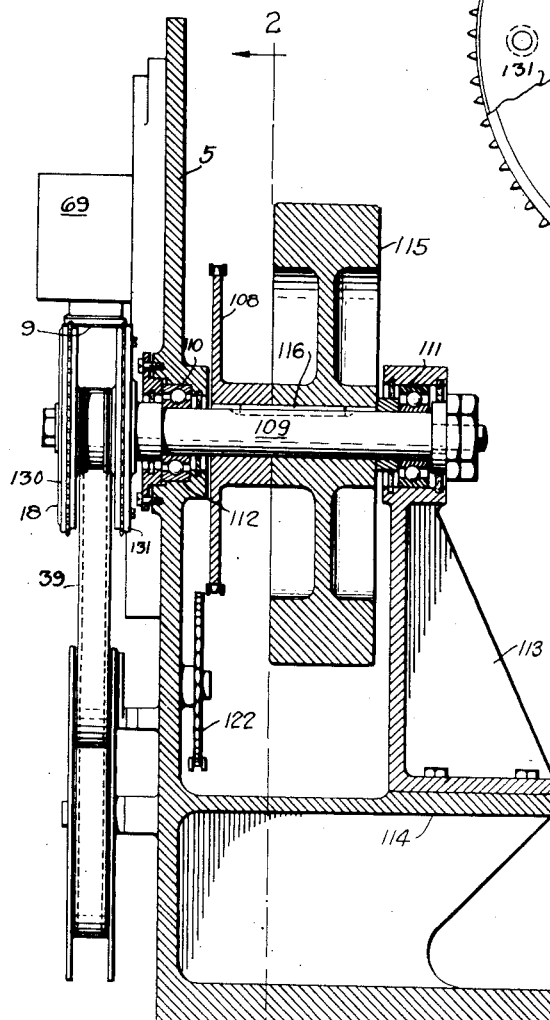
Fig. 5 is a sectional elevational view taken on line 5—5 of Fig. 1.
Figure 7:
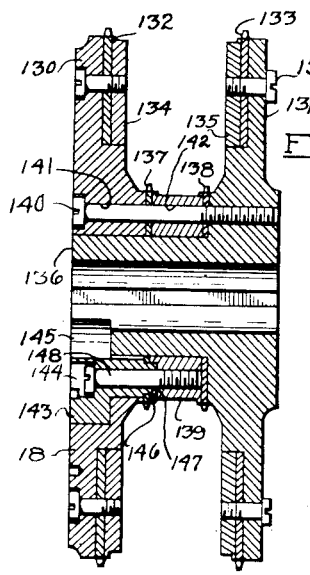
Fig. 7 is a sectional view taken on line 7—7 of Fig. 6.
Figures 8, 9:
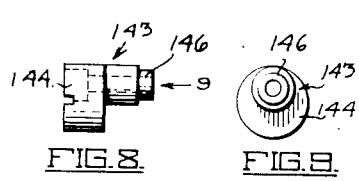
Fig. 8 is a side view of the eccentric adjusting member employed in the common lead sprocket.
Fig. 9 is an end view of the eccentric member taken in the direction of arrow 9 of Fig. 8.

Referring now to Fig. 5, the shaft 109 is journaled within ball bearings 110 and 111, the bearing 110 being mounted within an aperture 112 provided in the wall 5 while the bearing 111 is mounted in an upstanding bracket 113 mounted on top of a box section 114 forming part of the main casting. A flywheel 115 is mounted upon the shaft 109 adjacent the chain sprocket 108. Both the flywheel 115 and the sprocket 108 are securely fastened to the shaft as by a key 116. The front end of shaft 109 projects through the wall 5 and carries the common lead sprocket 18.

Mounted on the shaft 105 behind the sprocket 106 is a second sprocket (not shown) which is adapted to drive a chain 117. The chain 117 travels under a tensioning roller 188, thence up over a sprocket 119 mounted on a shaft 120 which is journaled within the wall 5 and carries at its other end the drive sprocket 32. From the sprocket 119 the chain 117 travels down under a sprocket 121 which is connected through a shaft 121' to the drive sprocket 62. From here the chain travels under sprocket 122 which drives the sprocket 43 and thence back to the drive sprocket situated on the shaft 105.

Referring now to the means for driving the take-up reels, it will be noticed that the spindle 2 of the take-up reel 1 has on the rear end thereof a pulley 123 adapted to be driven by an endless belt 124 which in turn is driven by a pulley 125 mounted on the shaft 120 adjacent the sprocket 119. The belt 124 is provided with sufficient tension to operate the take-up reel 1 but is adapted to slip sufficiently to prevent overtensioning of the film.

The spindle of the take-up reel 36 is also provided with a pulley 125' which is driven by a chain 126. The chain 126 is driven by a pulley 127 mounted on the shaft 121'.

What is claimed is:

1. An optical reduction printer comprising a pair of feed sprockets for films of different sizes, a pair of take-up reels for said film, a hold-back sprocket for each of said films, a common sprocket having sets of sprocket teeth of different diameters and adapted to advance said films intermediate said feed sprockets and said hold-back sprockets, free loops being formed between said common sprocket and said hold back sprockets, separated apertures at substantially right angles to one another, said films being advanced by said common sprocket at different speeds corresponding to the difference in sizes of said films past respective apertures, and means positioned intermediate the larger set of sprocket teeth for maintaining a film on said smaller set of sprocket teeth, said means comprising pad rollers positioned within the circumference of said larger set of said sprocket teeth.

2. A printer for printing a certain size positive from a larger size negative comprising a supply reel for said negative and a take-up reel for said negative, a supply reel and take-up reel for said positive, respective feed sprockets for said negative and positive and respective hold-back sprockets for said negative and positive, sprocket wheels adapted to rotate with said sprockets, means for interconnecting all of said sprocket wheels for common operation thereof, an integral combination sprocket intermediate said hold-back and said feed sprockets, said common sprocket being driven synchronously with said feed and hold-back sprockets, means for projecting a light beam from said larger negative to said smaller positive at points adjacent said common sprocket, and means for stiffening said film between said projection points and the respective portions of said common sprocket, said means including curved shoes for guiding said film tangentially on said portions.

3. In a system for optically printing a smaller positive from a larger negative, the combination of a sprocket having a pair of large sprocket teeth rings and an intermediate smaller pair of sprocket teeth rings, said larger pair advancing said negative and said smaller pair advancing said positive, a pair of dampened resilient means for retaining said films on said sprocket, one of said pairs being positioned intermediate said larger sprocket teeth rings and within the circumference of said larger sprocket teeth rings, a pair of aperture gates for said films, said gates being positioned at right angles to one another, and means for maintaining said films in a predetermined curved position intermediate the apertures in said gates and the respective sprocket teeth rings, said last mentioned means providing stiffness to said films between said respective sprocket teeth rings and the respective apertures of said gate.

4. An optical printer comprising a supply reel and a take-up reel for a negative film, a supply reel and take-up reel for a positive film, a feed sprocket and a hold-back sprocket for said negative film, a feed sprocket and a hold-back sprocket for said positive film, means adapted to rotate with said sprockets, means for interconnecting said rotating means for simultaneously operating all of said sprockets, a combination sprocket intermediate said feed sprockets and said hold-back sprockets for advancing both of said films, said combination sprocket being driven simultaneously with said other sprockets, a pair of separated aperture gates adjacent said combination sprocket and positoned at right angles to one another, means for positioning said films in curved positions between the aperture of said gates and said combination sprocket, and means for projecting a beam of light from one aperture to the said other aperture of different dimensions in accordance with the record on said negative film to be printed on said positive film.

5. A printer in accordance with claim 4 in which said last mentioned means includes different sized aperture plates and an optical reduction system.

6. A reduction optical printer comprising a unitary sprocket with sets of sprocket teeth rings of different sizes, the smaller set being intermediate the larger set, a pair of damped resilient means for maintaining films on said rings, one of said pair being positioned within the circumference of the larger set of rings, rollers on said resilient means for contacting respective films, a light aperture for each of said films, said apertures being spaced from said rings, a curved film shoe extending from one of said apertures to the larger set of said rings for guiding film tangentially on said rings, and a curved film shoe extending from the other of said apertures to the other set of said rings for guiding film tangentially on said rings, the curvature of said shoes being in opposite directions at said apertures.

7. An optical printer comprising a supply reel and a take-up reel for a negative film, a supply reel and take-up reel for a positive film, a feed sprocket and a hold-back sprocket for said negative film, a feed sprocket and a hold-back sprocket for said positive film, means adapted to rotate with said sprockets, means for interconnecting said rotating means for simultaneously operating all of said sprockets, a combination sprocket intermediate said feed sprockets and said hold-back sprockets for advancing both of said films, said combination sprocket being driven simultaneously with said other sprockets, a pair of separated aperture gates adjacent said combination sprocket and positioned at right angles to one another, means for positioning said films in curved positions between the apertures of said gates and said combination sprocket, and means for projecting from said negative film to said positive film a beam of light of different dimensions selective in accordance with the record on said negative film to be printed on said positive film.

ARTHUR W. CARPENTER.